United States Patent [19]
McGurrin et al.

[11] Patent Number: 5,913,063
[45] Date of Patent: Jun. 15, 1999

[54] DRAG AND DROP OBJECT SUBCLASSING

[75] Inventors: Scott McGurrin, Belmont; Ahmed Shah, Redwood City; John Pasalis, Mountain View, all of Calif.

[73] Assignee: Oracle Corporation, Redwood Shores, Calif.

[21] Appl. No.: 08/806,996

[22] Filed: Feb. 26, 1997

[51] Int. Cl.$^6$ ........................................ G06F 9/40
[52] U.S. Cl. .................... 395/702; 395/701; 395/703; 707/103; 345/326
[58] Field of Search ..................... 395/702, 701, 395/703, 685, 710; 707/100, 103; 345/326, 334, 335

[56] References Cited

U.S. PATENT DOCUMENTS

| | | | |
|---|---|---|---|
| 5,537,630 | 7/1996 | Berry et al. | 345/326 |
| 5,680,619 | 10/1997 | Gudmundson et al. | 395/701 |
| 5,689,669 | 11/1997 | Lynch et al. | 345/355 |
| 5,710,894 | 1/1998 | Maulsby et al. | 345/326 |
| 5,732,263 | 3/1998 | Havens et al. | 707/103 |

OTHER PUBLICATIONS

User's Guide, *Borland Delphi for Windows 95 & Windows NT*, pp. 12–13, 52–56, 195–198, Borland International, Inc., 1996.

*Primary Examiner*—James P. Trammell
*Assistant Examiner*—Demetra R. Smith
*Attorney, Agent, or Firm*—McDermott, Will & Emery

[57] ABSTRACT

A visual coding tool that allows a user to visually implement the full inheritance capabilities of object oriented programming languages is disclosed. This includes the ability to visually create a first object class which is a subclass of a second object class, where the first object class has, as one of its attributes, a third object class which is a subclass of a fourth object class. The third object class is not an attribute of the second object class, while the fourth object class is also not an attribute of the second object class. The visual coding tool includes a user interface which allows a user to visually create object classes and establish an object class hierarchy by "dragging and dropping" visual icons associated with object classes.

20 Claims, 11 Drawing Sheets

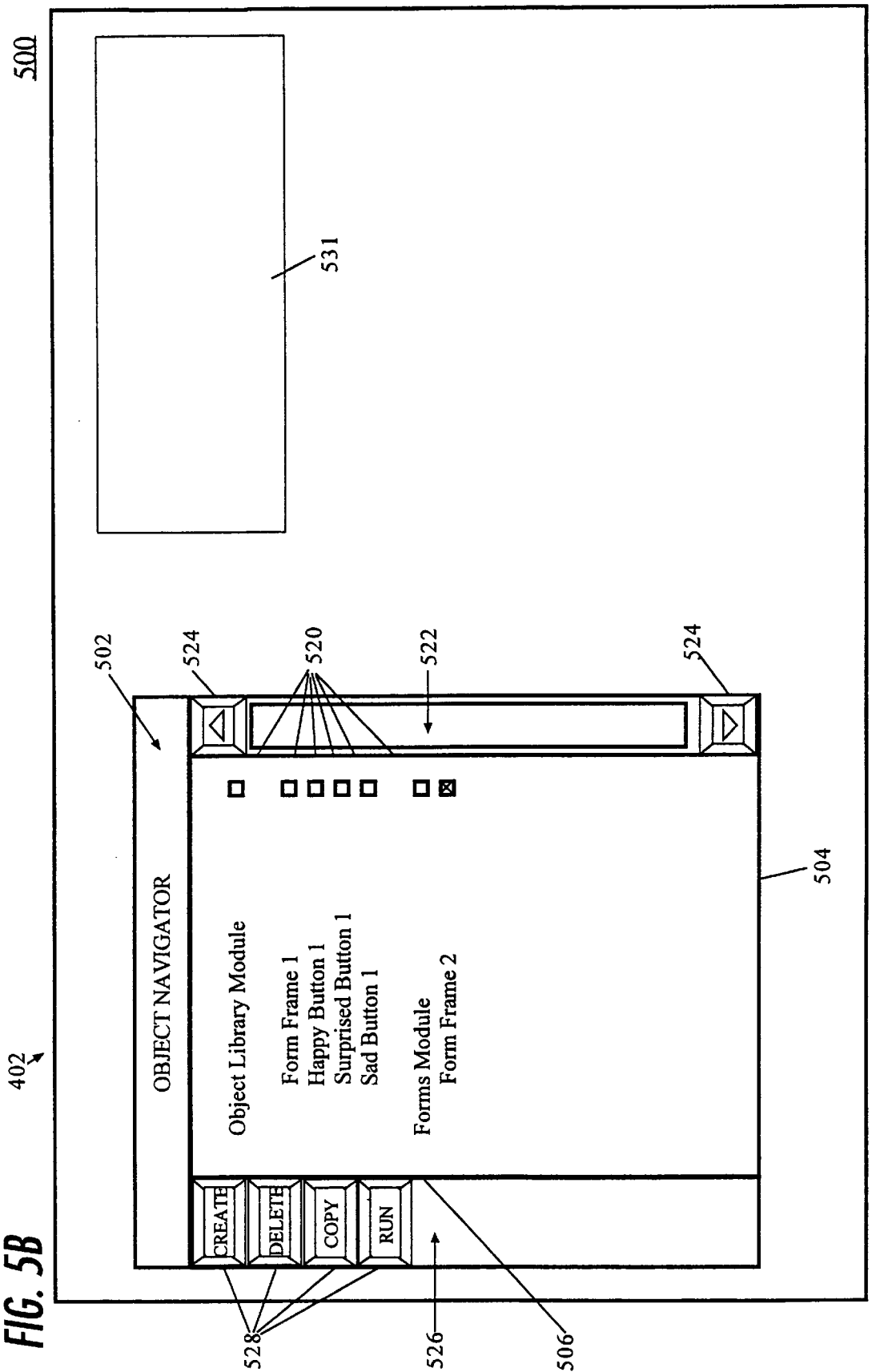

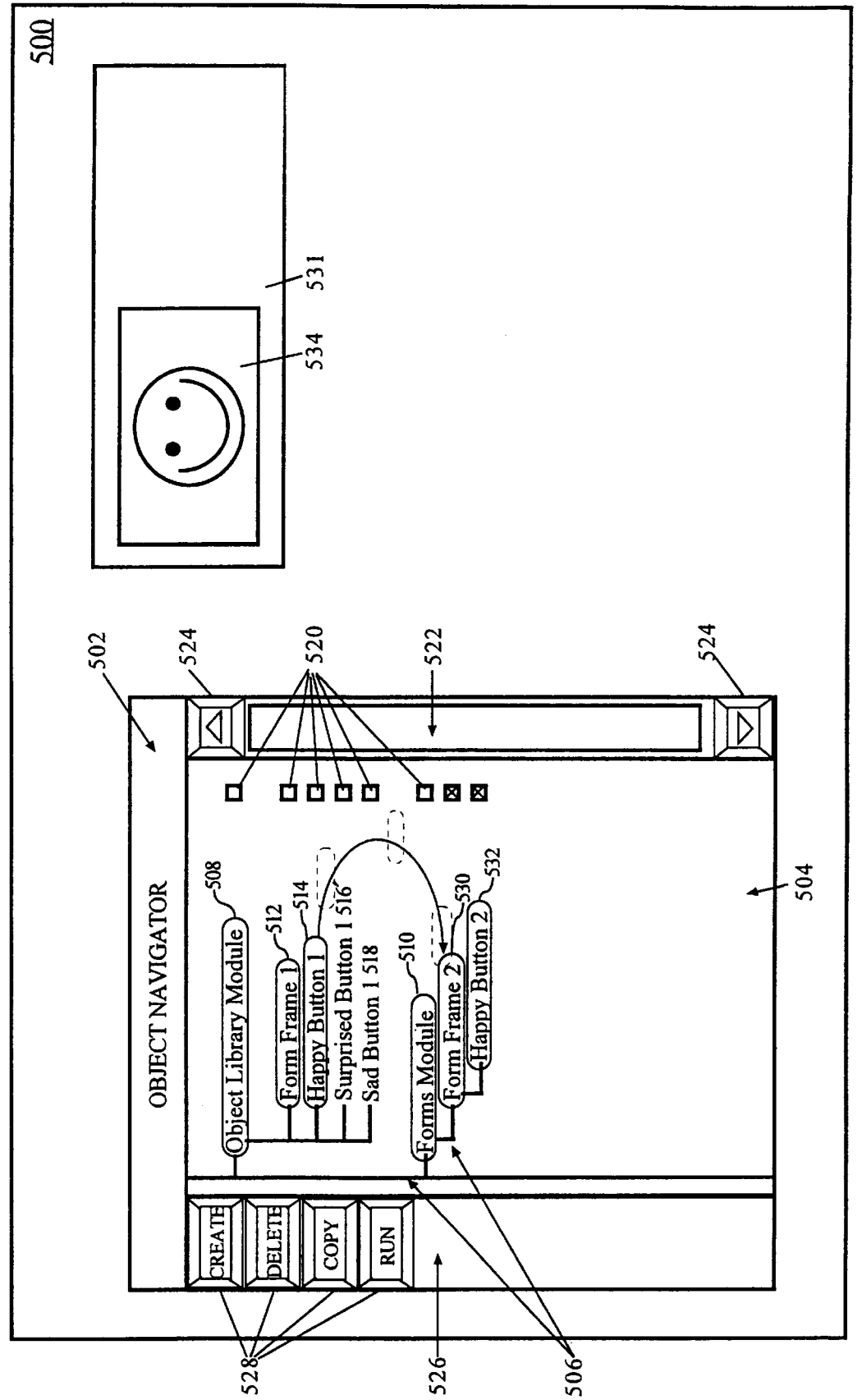

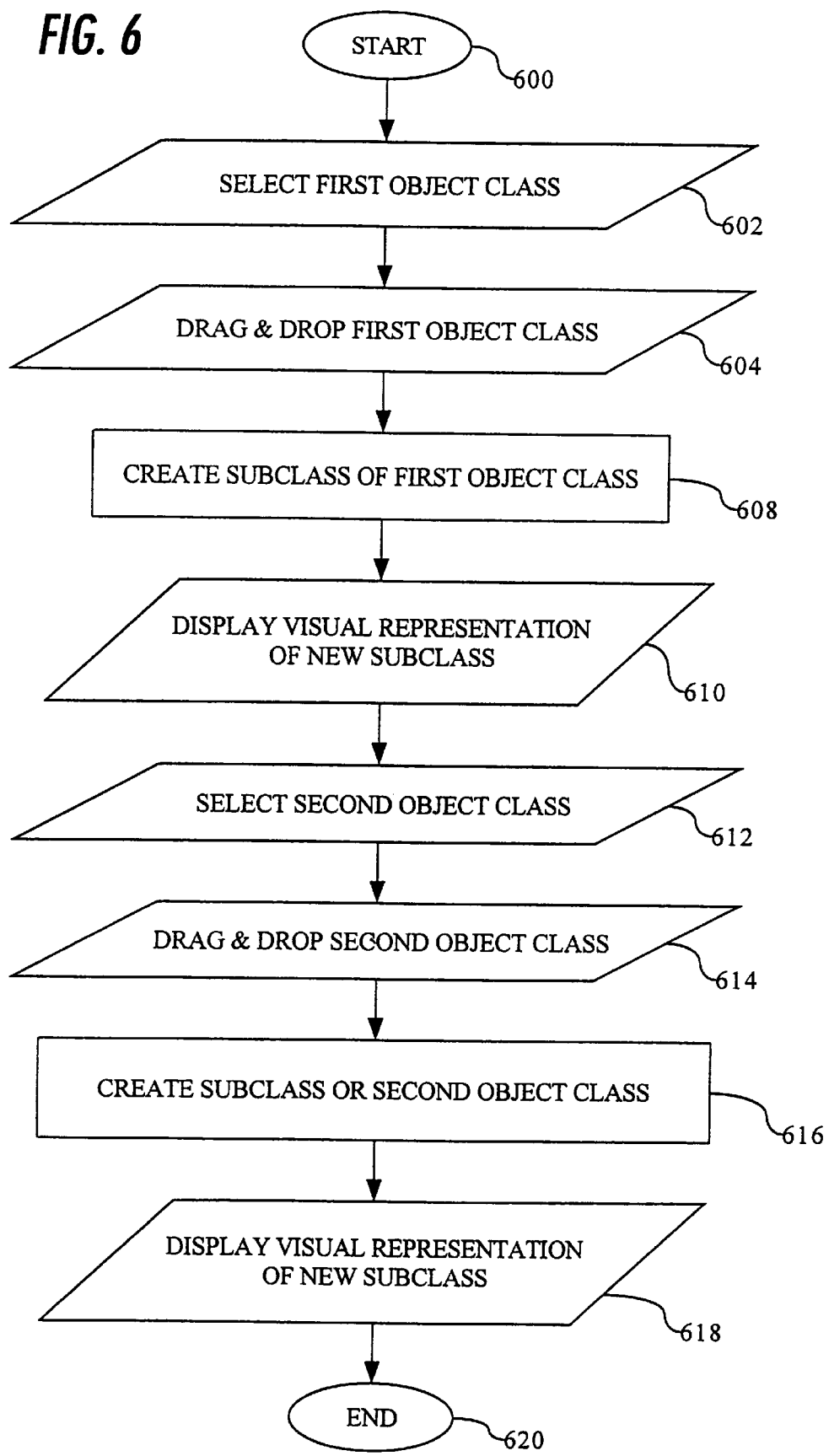

DRAG AND DROP OBJECT SUBCLASSING

FIELD OF THE INVENTION

The present invention relates to software design systems, and more particularly, to software design systems that support inheritance between object classes.

BACKGROUND OF THE INVENTION

In recent years, object oriented programming has become the standard programming paradigm. In object oriented programming, the world is modeled in terms of objects. An object is a record combined with the procedures and functions that manipulate it. All objects in an object class have the same fields ("attributes"), and are manipulated by the same procedures and functions ("methods"). An object is said to be an "instance" of the object class to which it belongs.

Sometimes an application requires the use of object classes that are similar, but not identical. For example, the object classes used to model both dolphins and dogs might include the attributes of nose, mouth, length and age. However, the dog object class may require a hair color attribute, while the dolphin object class requires a fin size attribute.

INHERITANCE

To facilitate programming in situations in which an application requires multiple similar attributes, object oriented programming supports "inheritance". Without inheritance, a programmer would have to write one set of code for the dog object class, and a second set of code for the dolphin object class. The code implementing the attributes and methods common to both object classes would appear redundantly in both object classes. Duplicating code in this manner is very inefficient, especially when the number of common attributes and methods is much greater than the number of unique attributes. Further, code duplication between object classes complicates the process of revising the code, since changes to a common attribute will have to be duplicated at multiple places in the code in order to maintain consistency between all object classes that have the attribute.

Inheritance allows a hierarchy to be established between object classes. The attributes and methods of a given object class automatically become attributes and methods of the object classes that are based upon the given object class in the hierarchy. For example, an "animal" object class may be defined to have nose, mouth, length and age attributes, with associated methods. To add these attributes and methods to the dolphin and dog object classes, a programmer can specify that the dolphin and dog object classes "inherit" the animal object class. Under these circumstances, the dolphin and dog object classes are said to be "subclasses" of the animal object class, and the animal object class is said to be the "parent" class of the dog and dolphin object classes.

The code for the inherited attributes and methods is located in the parent class and is not duplicated in any subclasses. The subclasses only contain the code for attributes and methods that supplement or override the attributes and methods of the parent class. Consequently, all revisions to a parent class automatically apply to all subclasses. For example, if the attribute "age" is defined as an integer in the animal object class and is not overridden in the dog and dolphin object classes, then the dog and dolphin object classes will include an integer to store an age value. If the animal object class is revised so that "age" is defined as a real number, then the dog and dolphin object classes will automatically include a real number to store an age value.

VISUAL CODING TOOLS

In the past, the process of generating source code has largely been restricted to manually typing text that conforms to the syntax of some programming language into some form of text editor to produce source code. This phase of software development can be extremely tedious and error prone, especially given the fact that large applications may involve millions of lines of code. To facilitate the coding of software applications, various "visual coding" tools have been developed.

With a visual coding tool, some or all of the source code of a software application is generated automatically based on user manipulation of visual elements displayed on a computer screen. For example, many visual software development environments allow a programmer to "paint" a user interface by simply drawing user interface elements such as windows, buttons, and text fields on the screen. After drawing a user interface, the user presses a button to cause the visual coding tool to generate source code which, when compiled, produces executable code that generates the user interface. More sophisticated visual coding tools are capable of generating source code "on-the-fly" as the user draws the user interface.

Some visual coding tools generate source code for object oriented programming languages. With these visual coding tools, a generic object class is typically defined for every type of visual element. When a user draws a particular visual element, the visual coding tool generates source code for (1) a new object class that inherits from the corresponding generic object class, where the attributes of the subclass are initially set to those reflected in the element drawn by a user, and (2) an instance of the new object class.

For example, assume that a user draws a window that has a particular size, color and location within a visual coding environment. The visual coding tool will typically generate (1) source code that defines a subclass of a generic window class and sets the initial values of the size, color and location attributes of the subclass to values that correspond to the size color and location of window drawn by the user, and (2) source code that declares an instance of the new window subclass.

OBJECT CLASS REFERENCING

One problem with currently available visual coding tools is that some of the most valuable features of object oriented programming are only partially supported, or are not supported at all. In particular, current visual coding tools do not provide full visual control over the inheritance feature of object oriented programming languages. For example, one visual coding tool allows users to create a "reference" in one application to an object class defined in another application.

When an object class defined in a first application is "referenced" in a second application, any modifications made to the object class in the first application will be reflected in the second application. However, the object class can only be modified in the first application. Thus, objects that belong to the object class are always identical in both applications. Therefore, the ability to "reference" an object class is not helpful for situations such as that described above where two object classes have some attributes in common and some attributes that are unique.

Further, the objects within the second application that are instances of the referenced object class are only updated to visually reflect the changes made in the object class of first application when the objects are loaded by the visual coding tool. Any changes made to the object class after the objects are loaded will not be reflected until the objects are reloaded.

In addition, the ability to "reference" an object class only allows object classes to be shared between applications, not between instances within the same application. Therefore, a user who desires an application to have two distinct windows that initially have identical attributes may have to resort to manual coding.

OBJECT REPOSITORY

Another visual coding tool allows users to add user defined forms to an "object repository." Adding a form to the object repository effectively adds the object class associated with the form to the object repository. The forms in the object repository may then be "inherited" by applications. When a form in the object repository is inherited by an application, an object class is created that is a subclass of the object class of the form in the object repository. An instance of the new object class is also declared, and a "child form" that reflects the attributes of the new object class is displayed.

Because the new class is a subclass of the object class in the repository (the "parent class"), the new object class initially inherits all of the attributes and methods of the parent class. Consequently, the child form will initially appear identical to the form associated with the parent class (the "parent form").

The user may then visually manipulate the child form. In response to user manipulation of the child form, attribute values of the parent class may be overridden in the child class, or new attributes may be added to the child class. For example, if the user changes the size of the child form, the size attribute of the new subclass will be set to a new value that overrides the size attribute of the parent object class. If a user adds a button to the child form, a button attribute that does not exist in the parent object class is added to the new object subclass.

By visually manipulating the parent form, the user changes the values of the attributes inherited from the parent object class. Such changes will also affect the attributes of the new object subclass to the extent that the attributes of the parent object class have not been overridden in the new object subclass. For example, assume that the object repository includes a form of class A that is displayed in the top left corner of the screen and is colored green. A user can inherit the form to create a class B. Initially the child form of class B will also be displayed in the top left corner of the screen and be colored green.

If a user changes the color of the child form to blue, the color of the parent form will be unaffected. If, after changing the color of the child form, the user changes the color of the parent form, then the color of the child form will be unaffected since the color attribute of class A has already been overridden in class B. However, if the user changes the position and size of the parent form, the position and size of the child form will be changed in an identical fashion. Similarly, if a user adds a button to the parent form, a button with identical attributes will be added to the child form.

With respect to forms, the object repository approach allows visual programmers to take advantage of the inheritance feature provided by the underlying object oriented programming language. However, the object repository approach has significant limitations. Specifically, the object repository does not support inheritance for any object class other than forms. Thus, a user cannot define a special button, add the button to the object repository, and "inherit" the button from the object repository to create numerous subclasses of the button.

The inability to automatically create subclasses of object classes for anything other than forms severely limits the usefulness of the object repository approach. For example, assume that a user wishes to create an application that includes the three forms 102, 104 and 106 illustrated in FIG. 1. Form 102 has two buttons 108 and 110, form 104 has two buttons 112 and 114, and form 106 has two buttons 116 and 118. Buttons 108 and 112 contain a happy face, buttons 110 and 118 contain a serious face, and buttons 114 and 116 contain a surprised face.

Ideally, a parent form class would be created by visually designing a "template" form 130. Forms 102, 104 and 106 would be created as instances of subclasses of the parent form class ("template" form 130). By creating forms 102, 104 and 106 as members of subclasses of the parent form class, the user would be able to automatically change attributes common to all of the forms 102, 104 and 106 simply by manipulating the template form 130. For example, a user could change the text displayed on forms 102, 104 and 106 by changing the text displayed on the template form 130. This type of form-to-form inheritance is supported by the object repository approach.

With respect to the buttons on the forms, it would be ideal to create a parent happy face button class by visually designing a template happy face button 132. Buttons 108 and 112 would be created as instances of subclasses of the parent happy face button class. By creating buttons 108 and 112 as members of subclasses of the parent happy face button class, the user would be able to automatically change attributes common to buttons 108 and 112 simply by manipulating the template happy face button 132. In the same manner, it would be ideal to define buttons 114 and 116 as members of subclasses of a parent surprised face class associated with a template button 134, and to define buttons 111 and 118 as members of subclasses of a parent serious face class associated with a template button 136.

Unfortunately, button-to-button inheritance is not supported by the object repository approach. Aside from the fact that all of the buttons are members of subclasses of the generic button class, there are no logical ties between the classes for buttons 108 and 112, the classes for buttons 110 and 118, nor the classes for buttons 114 and 116. Consequently, the user is forced to independently adjust the attributes for similar buttons. For example, to change the color of the happy face buttons 108 and 112 to yellow, the user would have to change the color attribute of button 108, and then change the color attribute of button 112.

USABILITY LIMITATIONS OF THE OBJECT REPOSITORY

Another disadvantage of the object repository approach is that it is relatively difficult to operate. For example, to create a subclass of a particular form class, the user must (1) display a form of the particular form class, (2) cause a menu associated with the form to be displayed, (3) select an "add to repository" menu option, (4) select a menu item from another menu to cause the object repository to be displayed, (5) select the appropriate form in the object repository, and (6) select an option to "inherit" the form.

The procedure is even more complicated if the original form class is defined in a different application than the application in which the subclass is desired. Under these circumstances, the first application must be opened, steps (1) through (3) described above are performed. Then the first application must be closed and the second application must be opened. After the second application is opened, steps (4) through (6) described above are performed.

Based on the benefits provided by object oriented programming and the limitations of current visual coding tools, it is desirable to provide a visual coding tool that allows a user to visually implement the full inheritance capabilities of object oriented programming languages. It is further desirable to provide a visual coding tool with a graphical user interface that simplifies the process of creating object subclasses based upon existing object classes.

SUMMARY OF THE INVENTION

According to one aspect of the present invention, a method is provided for establishing inheritance hierarchies between object classes in a visual programming environment. First, a first user interaction with a graphical user interface is detected. In response to the first user interaction, a first object class is created that is a subclass of a second object class. Then, a second user interaction with the graphical user interface is detected. In response to the second user interaction a third object class is created that is a subclass of a fourth object class, wherein the fourth object class is not an attribute of the second object class, and the third object class is established as an attribute of the first object class.

According to another aspect of the present invention, a method is provided for establishing relationships between attributes of objects designed in a visual programming environment. First, a first visual indicator associated with a first object class is displayed on a display device. Then, user interaction that specifies movement of the first visual indicator into a region of the display device associated with a second object class is detected. Finally, in response to detecting the user interaction, a third object class is created that is a subclass of the first object class and third object class is established as an attribute of the second object class.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 5A–5E are block diagrams of a visual coding tool according to an embodiment of the present invention;

FIG. 6 is a flow chart illustrating steps for creating a subclass according to an embodiment of the invention.

DETAILED DESCRIPTION OF THE PREFERRED EMBODIMENT

A visual coding tool which allows a user to visually implement the full inheritance capabilities of object oriented languages is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

HARDWARE OVERVIEW

Figure 1:
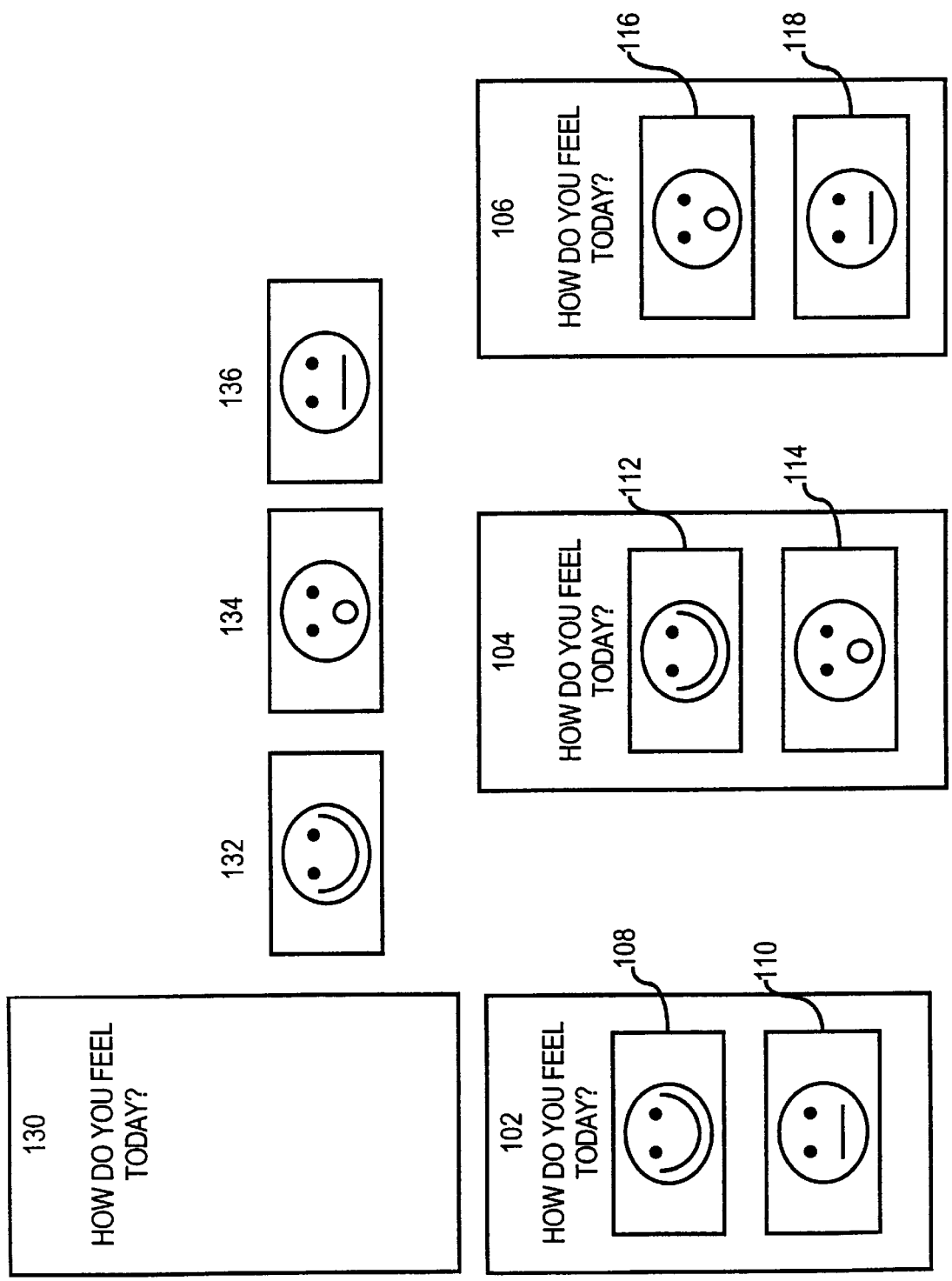
FIG. 1 is a block diagram illustrating object hierarchy.
Figure 2:
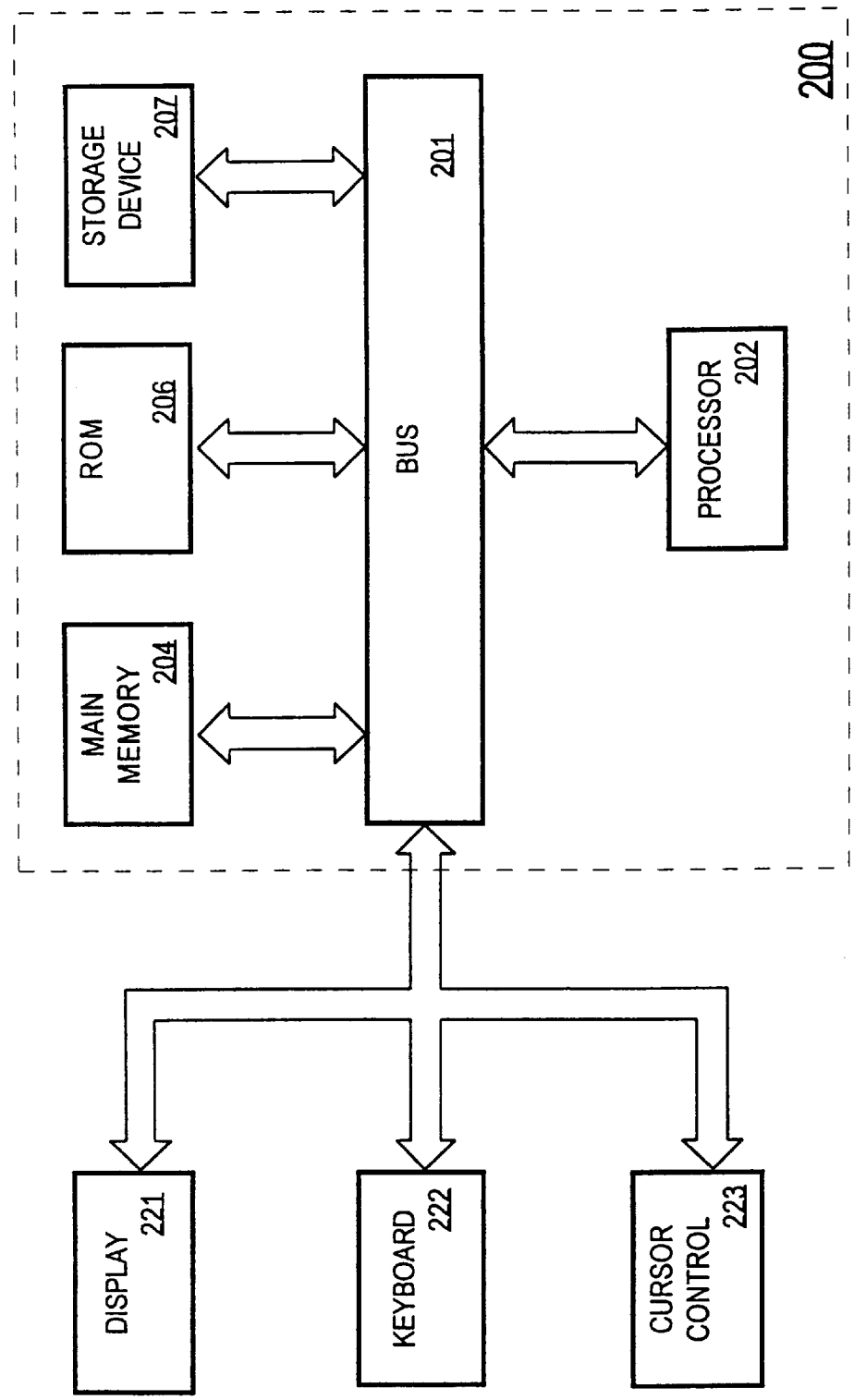
FIG. 2 is a block diagram of a computer system on which the present invention may be implemented.

Referring to FIG. 2, it is a block diagram of a computer system 200 upon which an embodiment of the present invention can be implemented. Computer system 200 includes a bus 201 or other communication mechanism for communicating information, and a processor 202 coupled with bus 201 for processing information. Computer system 200 further comprises a random access memory (AM) or other dynamic storage device 204 (referred to as main memory), coupled to bus 201 for storing information and instructions to be executed by processor 202. Main memory 204 also may be used for storing temporary variables or other intermediate information during execution of instructions by processor 202. Computer system 200 also comprises a read only memory (ROM) and/or other static storage device 206 coupled to bus 201 for storing static information and instructions for processor 202. Data storage device 207 is coupled to bus 201 for storing information and instructions.

A data storage device 207 such as a magnetic disk or optical disk and its corresponding disk drive can be coupled to computer system 200. Computer system 200 can also be coupled via bus 201 to a display device 221, such as a cathode ray tube (CRT), for displaying information to a computer user. Computer system 200 further includes a keyboard 222 and a cursor control 223, such as a mouse.

The present invention is related to the use of computer system 200 to provide a visual coding tool. According to one embodiment, a visual coding tool is provided performed by computer system 200 in response to processor 202 executing sequences of instructions contained in memory 204. Such instructions may be read into memory 204 from another computer-readable medium, such as data storage device 207. Execution of the sequences of instructions contained in memory 204 causes processor 202 to perform the process steps that will be described hereafter. In alternative embodiments, hard-wired circuitry may be used in place of or in combination with software instructions to implement the present invention. Thus, embodiments of the present invention are not limited to any specific combination of hardware circuitry and software.

FUNCTIONAL OVERVIEW

Figure 3:
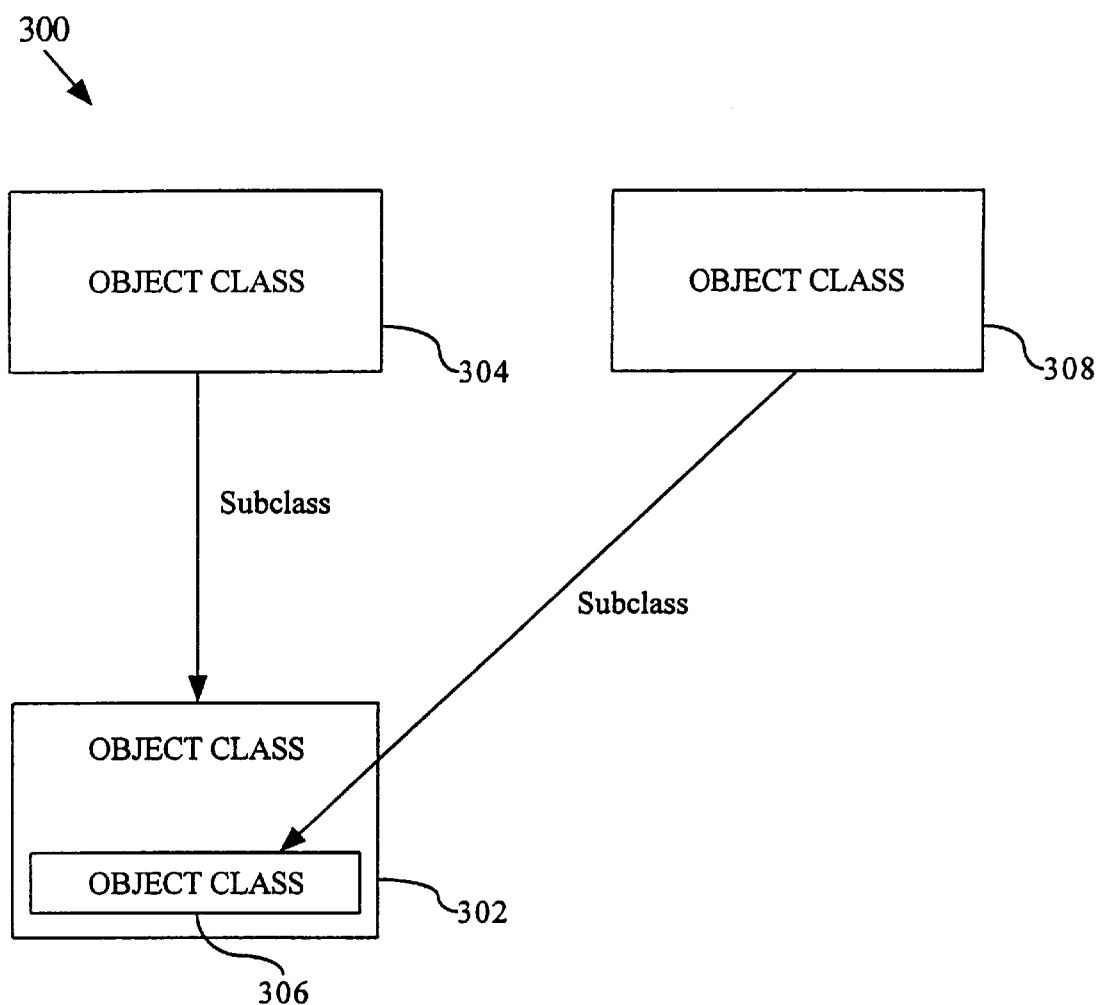
FIG. 3 is a block diagram illustrating object hierarchy according to an embodiment of the present invention.

The present invention provides a visual coding tool that allows a user to visually implement an object hierarchical structure having the full inheritance capabilities of object oriented programming languages. Full inheritance between object classes provided by the visual coding tool of the present invention is illustrated by the block diagram of FIG. 3.

Object class 302 is a subclass of object class 304 and inherits all of the attributes of object class 304. Any changes made to the attributes of object class 304 that have not been overridden in object class 302 are automatically propagated to object class 302. Object class 302 also has, as one of its attributes, object class 306, which is a subclass of object class 308. Object class 306 inherits all of the attributes of object class 308. Any changes made to the attributes of object class 308 that have not been overridden in object class 306 are automatically propagated to object class 306.

Object class 306 is neither a subclass nor an attribute of object class 304. Similarly, object class 308 is neither a subclass nor an attribute of object class 304. Consequently, changes to the attributes of object class 304 do not affect object class 308 or object class 306 and changes to the attributes of object class 308 do not affect object class 304. The result is that object class 302 inherits attributes from a parent object class 304 and has an attribute that inherits attributes from another parent object class 308, where the two parent object classes are unrelated to each other. It should be noted that object classes 302, 304, 306, 308 may be objects of any type and may also be subclasses of other object classes not illustrated.

The visual coding tool of the present invention also provides full override capability of attributes inherited from a parent object class. This capability allows a user to selectively override an attribute value in an object class inherited from a parent object class, effectively severing the link between the object class and its parent object class for that attribute. Consequently, once an inherited attribute has been overridden in an object subclass, further changes to that attribute in the parent object class are no longer propagated to the object subclass in which the attribute was overridden unless the override for this attribute is defeated.

For example, referring again to FIG. 3, if object class 304 has, as one of its attributes, a display attribute specifying the display color of object class 304 to be blue, then object class 302 will automatically inherit the same attribute, causing the display color of object class 302 to also be blue. However, the value of the display attribute of object class 302 may be overridden and changed to another color, for example red. Once the value of the display attribute in object class 302 has been overridden, it may be changed in object class 304 without affecting the object class 302. If the override is defeated, the inheritance link to object class 302 is restored.

VISUAL CODING TOOL

Figure 4:
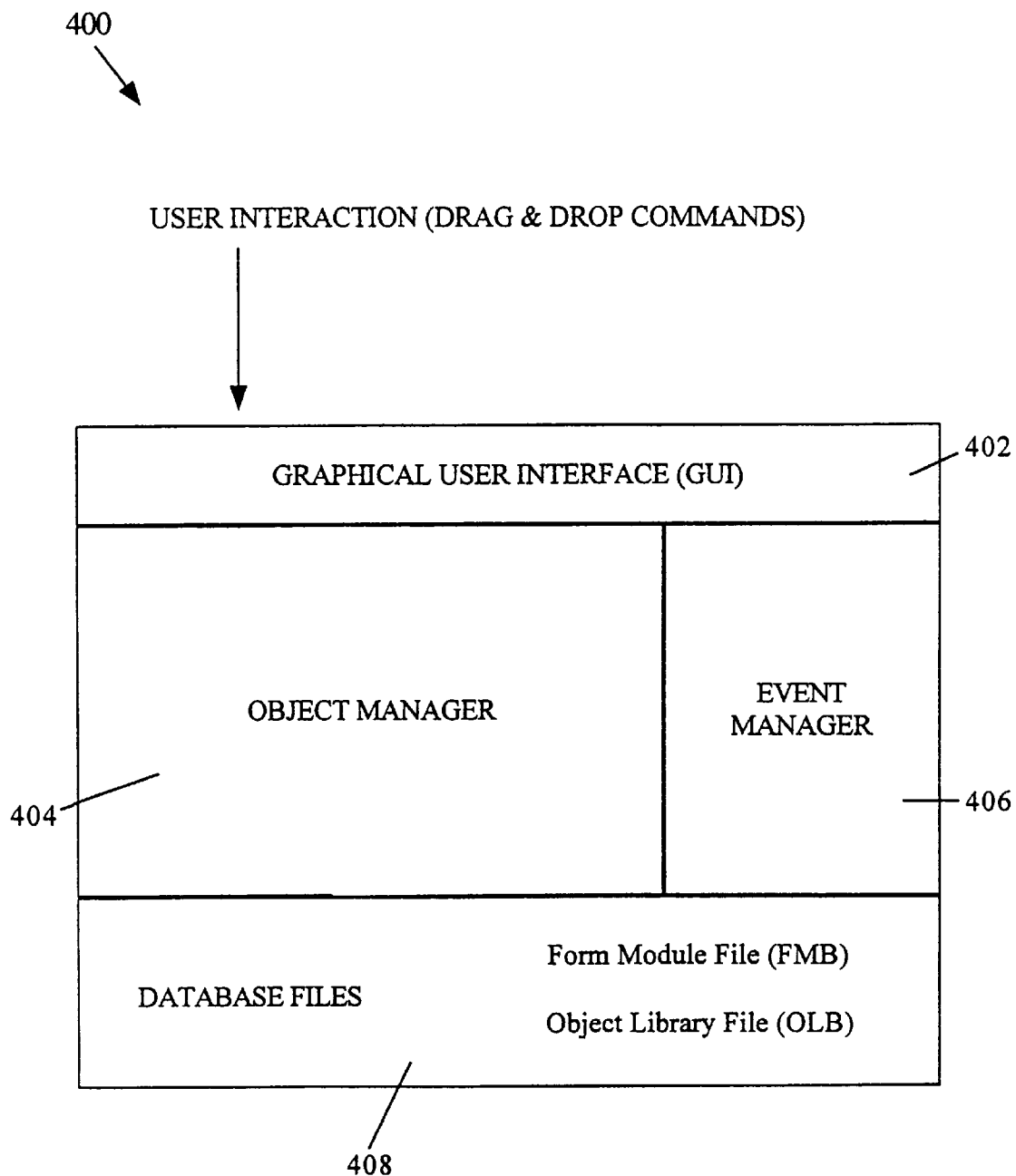
FIG. 4 is a block diagram of a graphical user interface of a visual coding tool according to an embodiment of the present invention.

The visual coding tool of the present invention provides a user friendly design environment in which a user may visually create an application object hierarchy based upon an underlying object oriented programming language. The visual design capabilities of the visual coding tool make it relatively easy for a user to update an application object hierarchy and then launch an executable to run the application. As illustrated by the block diagram of FIG. 4, the visual coding tool 400 of the present invention includes four basic components: (1) a graphical user interface (GUI) 402, (2) an object manager 404, (3) an event manager 406, and (4) database files 408.

GRAPHICAL USER INTERFACE (GUI)

Generally, graphical user interface (GUI) 402 of visual coding tool 400 provides a visual design environment in which a user may design an object class hierarchy based upon an underlying object oriented programming language. GUI 402 displays a current object class hierarchy and allows the user to visually alter the object class hierarchy by deleting and creating object classes. A "drag and drop" capability allows a user to easily create object classes without having to scroll through cumbersome menus and screens. In addition, changes to the object class hierarchy are immediately reflected on a graphical representation of the object class hierarchy without the user having to separately request that the display screen be refreshed.

Figure 5A:
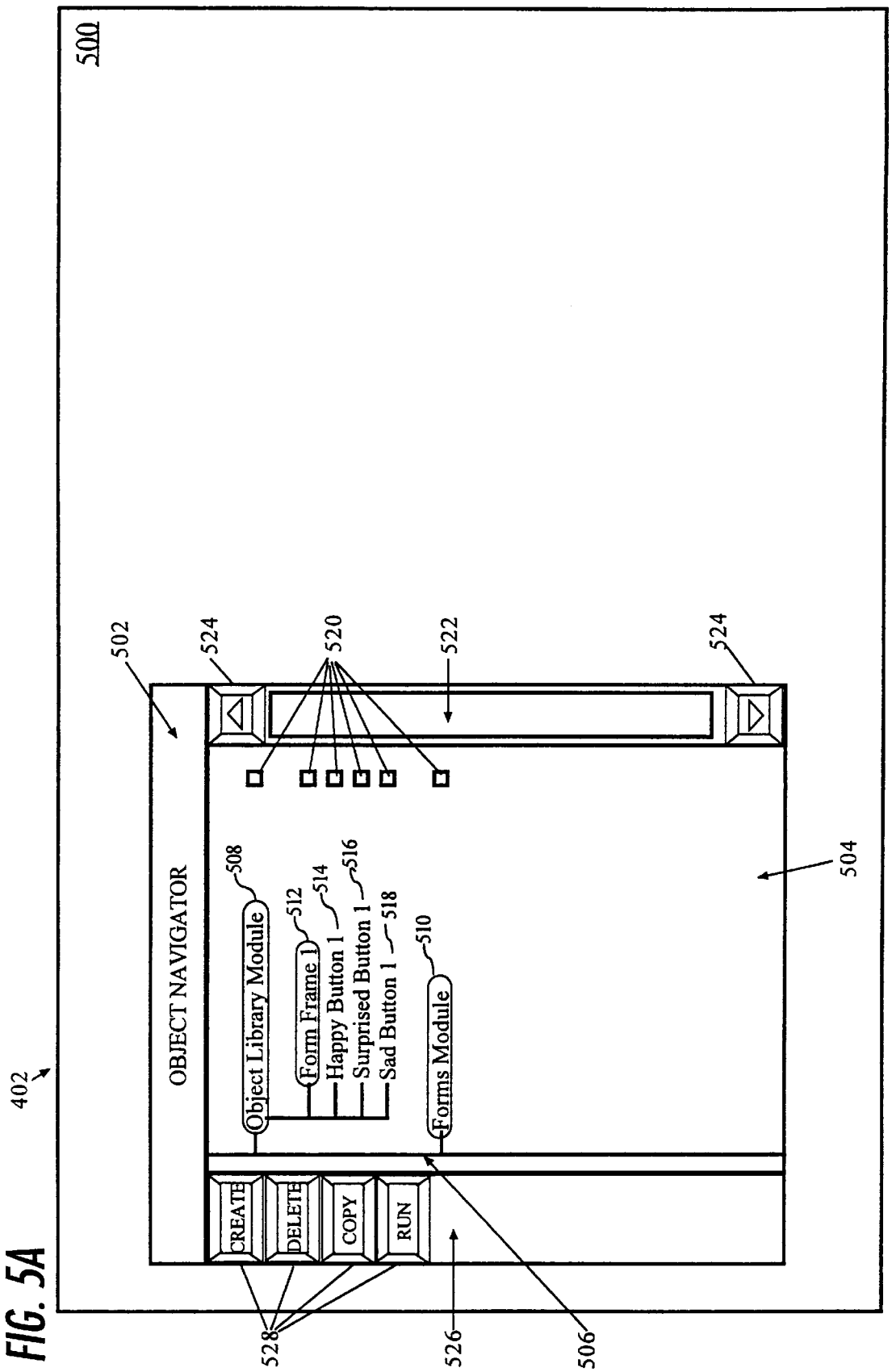

FIG. 5A illustrates the GJUI 402 of the visual coding tool 400 according to an embodiment of the present invention. GUI 402 includes a graphical display 500 upon which all of the visual components of GUI 402 are displayed. GUI 402 also includes an object navigator 502 having a graphical display 504. Graphical display 504 includes a visual representation, in the form of a hierarchical tree 506, of all of the open object classes. As illustrated in FIG. 5A, hierarchical tree 506 includes two object modules, an object library module 508 and a forms module 510. Below each module 508,510 are the object classes which are contained in the particular module. Specifically, object library module 508 contains form object classes, form frame 512, happy button 514, surprised button 516 and sad button1 518, while the forms module 510 does not currently contain any object classes.

A visual icon 520 associated with each object class is displayed next to each object class. Each visual icon 520 indicates whether an object class is a subclass of another object class and also provides access to attributes for the associated object class. According to one embodiment of the present invention, the attributes for a given object class are accessed by selecting an object class with a mouse or other cursor control device, and then pressing the right mouse button on the mouse. A property palette is then displayed which includes an option for displaying and editing the attributes for the selected object class. The values for specific attributes may then be changed by the user as desired. The two charts below illustrate the attributes of the module objects and other objects according to an embodiment of the present invention. Since the module objects are containers for other objects, they have different attributes than the objects contained within the modules.

| MODULE | OBJECT CLASS |
| --- | --- |
| General | General |
| Navigation | Functional |
| Records | OCX |
| Database | DBV/2000 Integration |
| Advanced Database | Chart |
| Scrollbar | Navigation |
| Font and Color | Data |
| Character Mode | Calculation |
| International | Records |
|  | Database |
|  | List of Values (LOV) |
|  | Editor |
|  | Physical |
|  | Font and Color |
|  | Visual Attribute Group |
|  | Font Name |
|  | Font Size |
|  | Font Weight |
|  | Font Style |
|  | Font Spacing |
|  | Foreground Color |
|  | Background Color |
|  | Fill Pattern |
|  | Character Mode Logical Attribute |
|  | White on Black |
|  | Prompt |
|  | Prompt, Font and Color |
|  | Help |
|  | International |

Object navigator 502 also includes a scroll bar 522 and direction buttons 524, for changing the portion of hierarchical tree 506 displayed within graphical display 504.

Object navigator 502 also includes a toolbar 526 having one or more module function buttons 528. Each module function button 528 initiates a function affecting modules currently open in GUI 402. For example, the COPY function button 528 is used to make a copy of a module open in GUI 402, such as object library module 508. According to one embodiment of the present invention, the RUN function button 528 causes a forms engine to be launched which then processes the current application object hierarchy.

DRAG AND DROP

A method for using GUI 402 to visually implement the full inheritance capabilities of object oriented programming languages according to an embodiment of the present invention is now described with reference to FIGS. 5A–5E and the flow chart of FIG. 6.

As illustrated in FIG. 5A, forms module 510 does not contain any object classes while object library module 508 contains four object classes. Creating an object class which is a subclass of one of the object classes contained within object library module 508 involves the following steps. After starting in step 600, in step 602 object class FORM FRAME1 512 is selected using a mouse or other cursor control device. Selecting object class FORM FRAME1 512 causes a "ghost" outline image of object class FORM FRAME1 512 to be displayed on GUI 402, which can then be moved around graphical display 500 using the mouse.

In step 604, as illustrated in FIG. 5B, object class FORM FRAME1 512 is "dragged" and "dropped" onto FORMS MODULE 510 which causes an object class FORM FRAME2 530 to be created as a subclass of FORM FRAMES 512 in step 608. Then, in step 610, a visual representation 531 of the new object class FORM FRAME2 530 is displayed on graphical display 500. As a subclass of object class FORM FRAME1 512, object class FORM FRAME2 530 automatically and instantly inherits all of the attributes of object class FORM FRAME1 512. Consequently, any changes to the attributes of the object class FORM FRAME1 512 are automatically propagated to object class FORM FRAME2 530. In addition, the visual icon 520 associated with object class FORM FRAME2 530 provides a visual indication that object class FORM FRAME2 530 is a subclass. A user may then view the subclass attributes associated with object class FORM FRAME2 530 to see the designated parent class.

According to one embodiment of the present invention, the visual indication that an object class within hierarchical tree 506 is a subclass is provided by a check mark located in the visual icon 520 associated with the object class.

Returning now to FIG. 5C and step 612 where object class HAPPY BUTTON1 514 is selected, dragged and dropped onto object class FORM FRAME2 530 in step 614. This automatically creates object class HAPPY BUTTON2 532, which is a subclass of object class HAPPY BUTTON1 514, in step 616. At approximately the same time, a visual representation 534 of object class HAPPY BUTTON2 532 is displayed on graphical display 500 in step 618. The process is then complete in step 620.

Specifically, the visual coding tool 400 of the present invention allows a user to create a first object subclass of a first object class, wherein the first object subclass has, as one of its attributes, a second object subclass of a second object class. Hence, the first object subclass inherits attributes from one parent object class and has an attribute that inherits attributes from a different parent object class.

As illustrated by FIGS. 5A–5C and the flowchart of FIG. 6, the visual coding tool 400 of the present invention allows the user to easily implement the full inheritance capabilities of object oriented programming languages. Specifically, object class FORM FRAME2 530 is a subclass of object class FORM FRAME1 512. Object subclass FORM FRAME2 530 has, as one of its attributes, object class HAPPY BUTTON2 532, which is a subclass of object class HAPPY BUTTON1 514.

Although, for purposes of simplicity, a specific application of the visual coding tool 400 of the present invention has been described with respect to a subclass inheriting attributes from two different parent object classes, the invention is equally applicable to any number of object subclasses inheriting attributes from any number of parent object classes of any type.

Figure 5D:
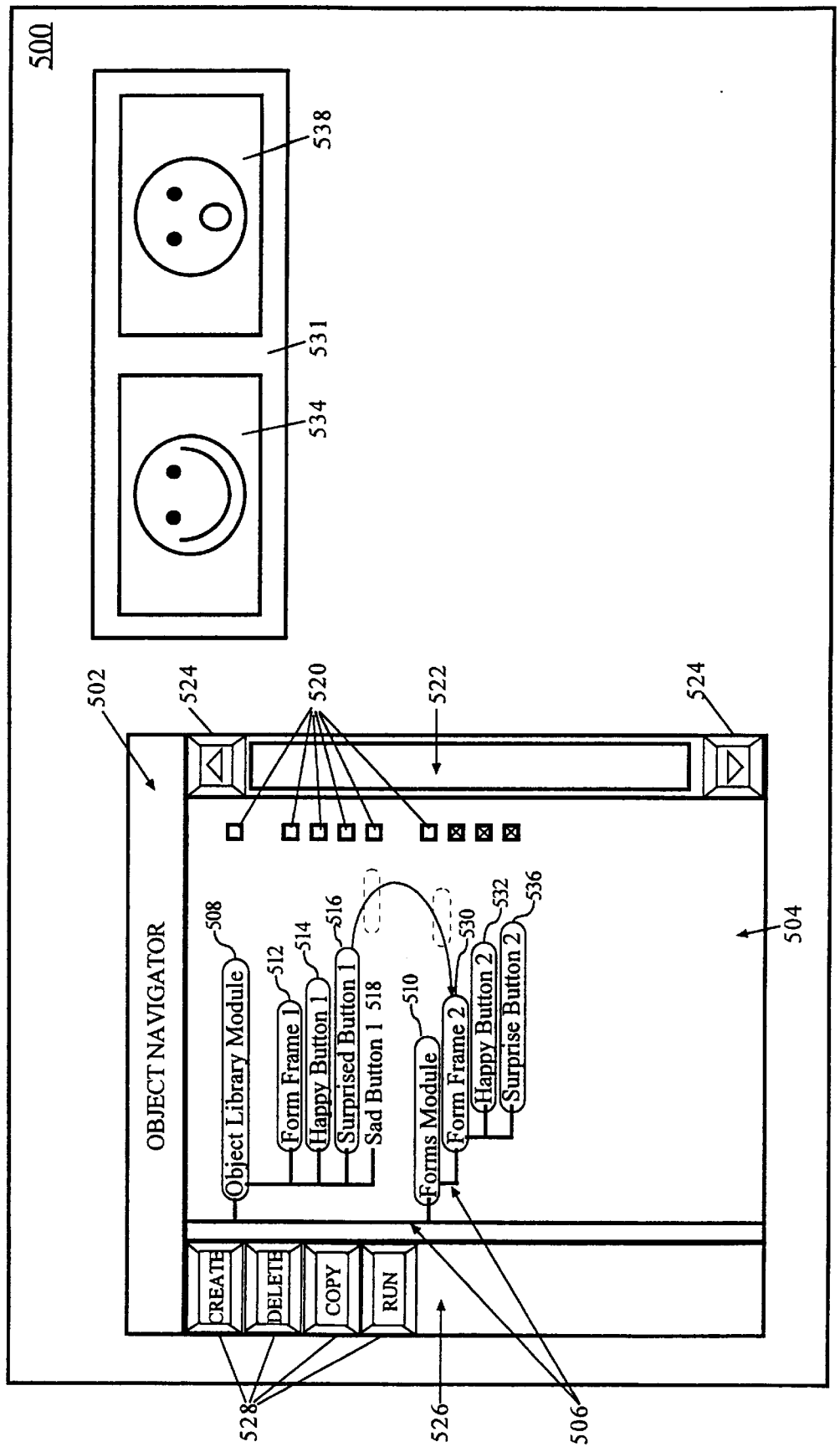

As illustrated in FIG. 5D, an additional attribute may be added to object class FORM FRAME2 530 by dragging and dropping object class SURPRISED BUTTON1 534 onto object class FORM FRAME2 530 to create object class SURPRISED BUTTON2 536 which is an attribute of object class FORM FRAME2 530. Object subclass SURPRISED BUTTON2 536 is visually represented on graphical display 500 as visual representation 538.

Figure 5E:
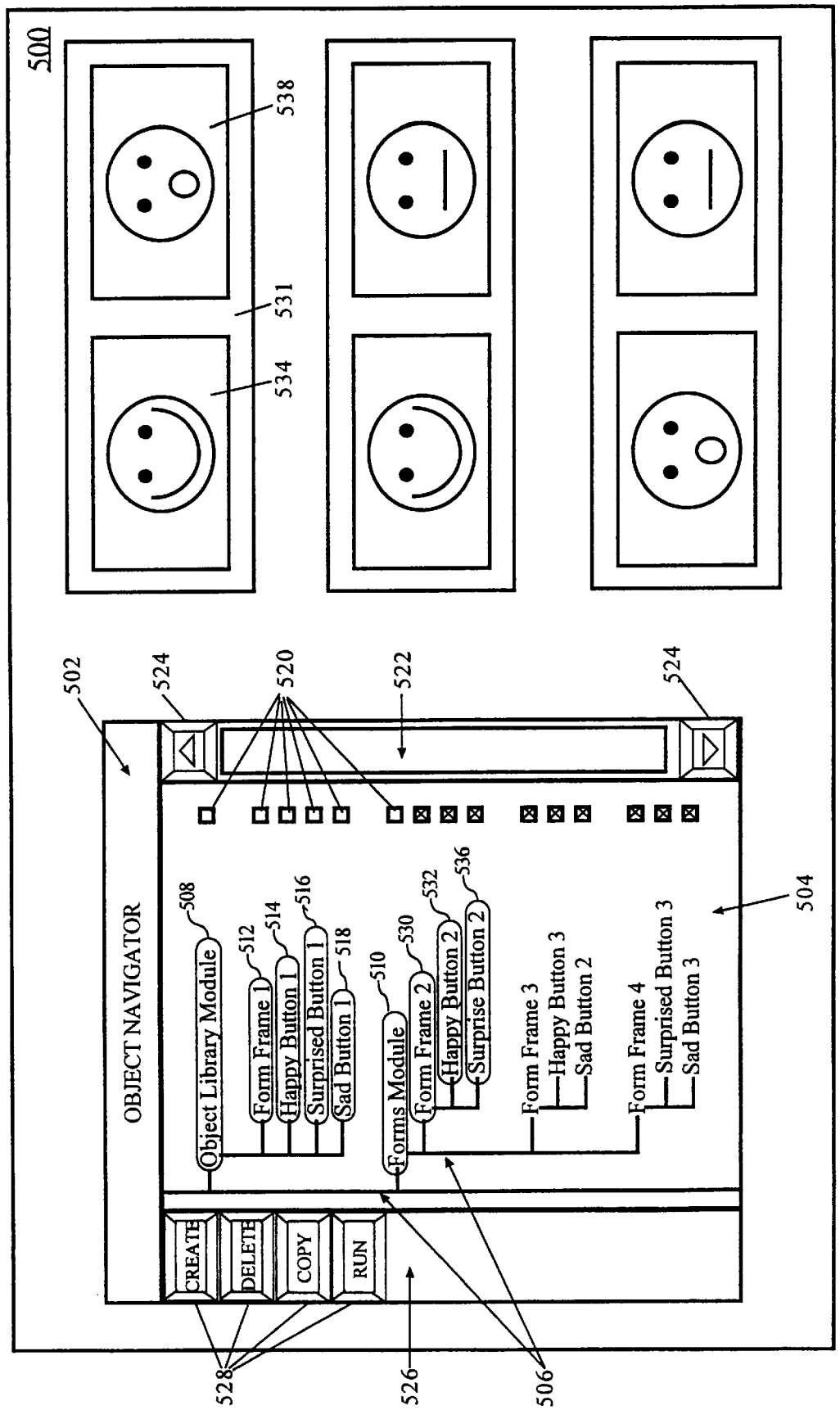

In addition, additional subclasses may be created using the drag and drop capabilities of the visual coding tool 400 of the present invention as illustrated in FIG. 5E. Referring to FIG. 5E, three forms have been added to forms module 510, each of which is a subclass of FORM FRAME1 512. The attributes of each of the three forms include face buttons, where each form object has a different combination of face buttons. Each of the face button objects on the three forms is a subclass of a face button object in the object library module 508. Consequently, all buttons with a given type of face may be modified simply by modifying the parent face button object for that type of face. Similarly, all three forms can be modified simply by modifying the parent form object (FORM FRAME 1) from which they all inherit attributes.

EVENT MANAGER

Referring again to FIG. 4, event manager 406 is responsible for processing user interaction (drag and drop commands) received by user interface 402. In response to detecting user interaction with the GUI 402, the event manager 406 sends messages to object manager 404. Object manager 404 responds to the messages from the event manager 406 by updating the internal representations of object classes based on the type of action performed on the GUI 402.

OBJECT MANAGER

Object manager 404 is responsible for maintaining all internal data structures associated with all of the open objects within visual coding tool 400. These data structures are created and updated based on messages generated by the event manager 406 in response to user interaction with the GUI 402.

The object manager 404 maintains data structures associated with existing objects within visual coding tool 400 and creates new data structures as new objects are created using visual coding tool 400. For example, referring to FIG. 7, the data structure 702 for a particular object class (FORM1) is stored in memory and maintained by the object manager 404. Within the data structure 702, the object manager 404 stores values for the properties associated with the FORM1 object class.

When a user interacts with the GUI 402 in the manner prescribed to create a subclass of FORM1 (e.g. by dragging a visual indicator associated with FORM1 from the object library module 508 into the visual indicator associated with forms module 510), the object manager 404 generates and stores a new data structure for the new subclass. Data is then generated to indicate the parent/child relationship between the two data structures. According to an embodiment of the invention, the data generated to indicate parent/child relationships between data structures includes two pointers: a "child" pointer and a "parent" pointer. The child pointer is stored in the data structure associated with the parent class and points to the data structure associated with the subclass (the "child class"). The parent pointer is stored in the data structure associated with the child class and points to the data structure associated with the parent class.

Figure 7:
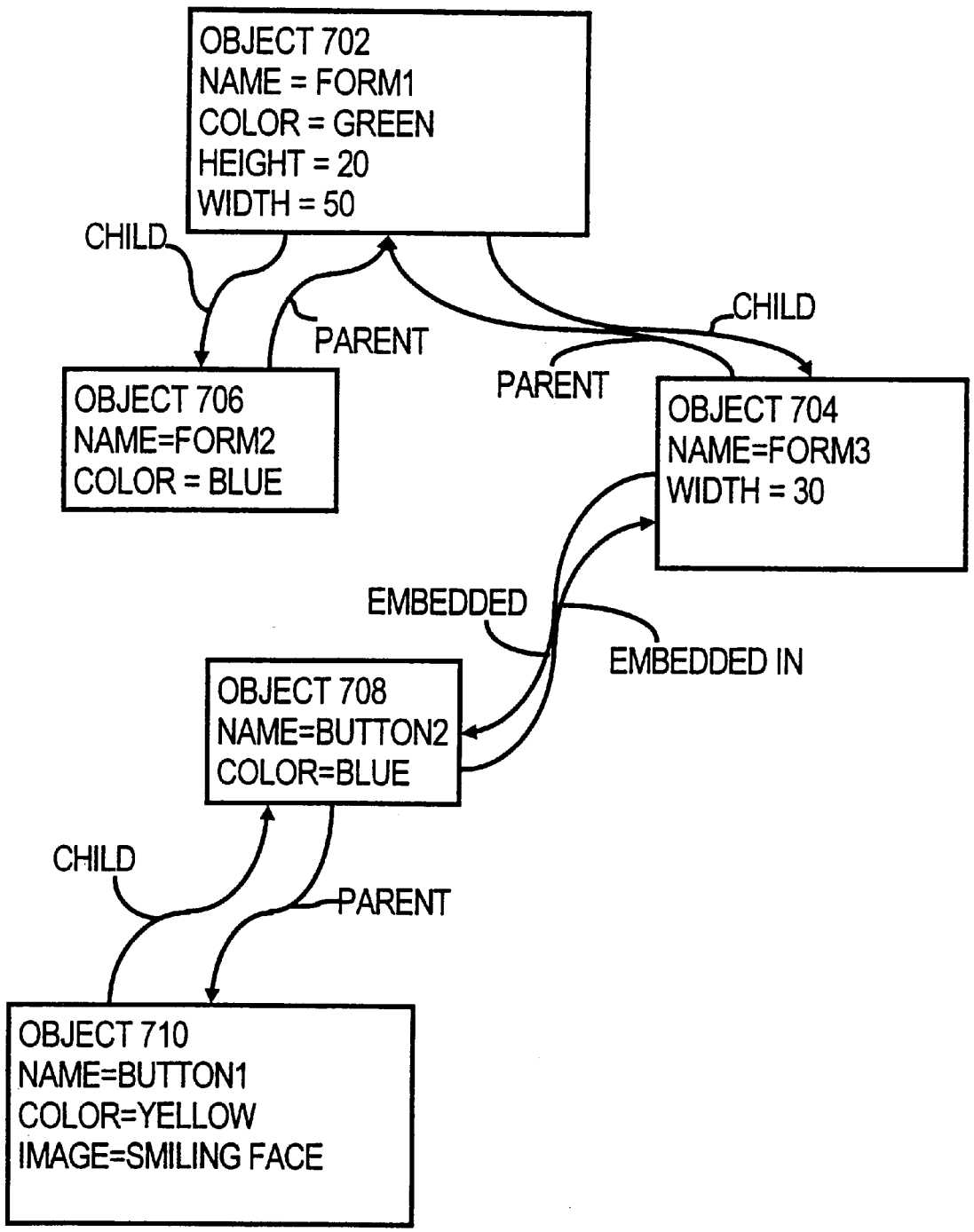
FIG. 7 is a block diagram illustrating data structures used to track the relationships between object classes according to an embodiment of the invention.

In the embodiment illustrated in FIG. 7, two subclasses of FORM1 have been generated: FORM2 and FORM3. A data structure 706 for FORM2 has been generated and connected to the data structure 702 for FORM1 by two pointers. A "child" pointer points from data structure 702 to data structure 706 and a "parent" pointer points from data structure 706 to data structure 702. Similarly, a data structure 704 for FORM3 has been generated and connected to the data structure 702 for FORM1 by two pointers. A "child" pointer points from data structure 702 to data structure 704 and a "parent" pointer points from data structure 704 to data structure 702.

According to one embodiment of the invention, no property values are initially stored in the data structure of a child object class, since all such values are initially identical to (inherited from) the property values of the parent object class. However, when a property value is overridden in a subclass, the new value is stored in the data structure associated with the subclass.

In the illustrated example, the color property of FORM1 has been overridden in FORM2, so the data structure 706 for FORM2 stores a different value (blue) for the color attribute than the value (green) stored for the color attribute in the data structure 702 for FORM1. No other attributes of FORM1 have been overridden in FORM2. Similarly, the data structure 702 for FORM3 contains the value "30" for the "width" property because the width of FORM1 has been overridden in subclass FORM3.

EMBEDDED OBJECTS

An object class can be an attribute of another object class. An object class that is an attribute of another object class is said to be "embedded" within the other object class. According to an embodiment of the invention, pointers are used to connect the data structure associated with an object class and the data structures associated with object classes embedded in the object class.

In the example illustrated in FIG. 7, an object class BUTTON2 is embedded in the object class FORM3. Consequently, the data structure 708 associated with the object class BUTTON2 contains an "embedded in" pointer to the data structure 704 associated with object class FORM3. Conversely, the data structure 704 associated with object class FORM3 has an "embedded" pointer to the data structure 708 associated with object class BUTTON2.

DISPLAY AND REFRESH OPERATIONS

According to an embodiment of the invention, visual coding tool 400 allows a user to display visual representations of object classes, and to change the properties of object classes by visually manipulating the representations of object classes. Consequently, the visual coding tool 400 must be able to (1) draw a visual representation of an object class that accurately portrays the attributes and property values of the object, and (2) refresh the currently-displayed visual representations of object classes when a property is changed in an object class. As shall be described in greater detail hereafter, the "parent" and "embedded" pointers are used to determine how to display a representation of an object class. The "child" and "embedded in" pointers are used to determine which displayed visual representations must be updated when a property of a class is changed.

DISPLAYING REPRESENTATIONS OF OBJECT CLASSES

With property values stored in the manner described above, the object manager 404 is able to determine all of the attributes and property values associated with any given class by (A) establishing the data structure associated with the class as a "current" data structure, (B) reading the attribute and property values (if any) from the current data structure, (C) following the parent pointer (if any) stored within the current data structure to the data structure of a parent class, (D) establishing the data structure of the parent class as the current data structure, and (E) repeating steps (B) through (D) until the current data structure does not have a parent pointer.

For example, when a user requests the display of a representation of FORM2, the object manager 404 reads from data structure 706 that the representation should have the color blue. The object manager 404 then follows the parent pointer stored in data structure 706 to data structure 702. From data structure 702, the object manager reads that FORM2 is to have a height of 20 and a width of 50. The value of the color property stored in data structure 702 is ignored since a color value has already been encountered in a child data structure. The object manager 404 supplies the attribute value information to the user interface, which renders a representation based on the property values.

When displaying the representation of an object, the "embedded" pointers in the data structure associated with the object class are traversed to find the data structure associated with the embedded object class, and the property value acquisition procedure described above is performed for the embedded object class to determine how to display a representation of the embedded object class.

For example, in addition to inspecting data structures 702 and 704 to determine how to display FORM3, the embedded pointer in data structure 704 is followed to data structure 708. Data structure 708 is inspected to determine that a BUTTON2 must be displayed as part of displaying FORM3. Data structure 708 further indicates that the button is blue. The parent pointer of data structure 708 is then followed to data structure 710, which is associated with an object class BUTTON1. Data structure 710 is inspected to determine that an image of a smiling face is to be displayed on the BUTTON2 on FORM3.

REFRESHING OBJECT CLASS REPRESENTATIONS

As mentioned above, changes made to attributes of object classes are immediately reflected in the displayed representations of object classes and in the displayed representations of all subclasses that have not overridden the changed attributes. The operation of causing changes to be visually reflected in displayed representations of object classes is referred to herein as a refresh operation.

During a refresh operation, the "embedded in" pointers and "child" pointers connecting the data structure for the modified object class to the data structures of object classes are used to identify which visual representations need to be updated in response to any given change. In general, the visual representations of all object classes whose data structures are connected to the data structure of the updated object class by a pointer chain comprised of any number or combination of "child" and "embedded in" pointers have to be refreshed, with the one exception that such pointer chains do not include data structures that override the changed attribute.

For example, if the height of FORM1 is changed from 20 to 30, then all representations of FORM1 must be refreshed. The data structure associated with FORM1 is data structure 702. Data structure 702 is connected to the data structure 706 associated with FORM2 by a child pointer, and FORM2 does not override the changed attribute (i.e. height). Therefore, all representations of FORM2 have to be updated during the refresh operation. Similarly, data structure 702 is connected to the data structure 704 associated with FORM3 by a child pointer, and FORM3 does not override the changed attribute. Therefore, all representations of FORM3 have to be updated during the refresh operation.

If the color attribute of BUTTON1 is changed from yellow to red, all representations of BUTTON1 are updated to reflect this change. Data structure 708 for BUTTON2 is connected to the data structure 710 associated with BUTTON1 by a child pointer, but BUTTON2 overrides the color attribute of BUTTON 1. Consequently, representations of BUTTON2 are not updated in response to the modification of the color attribute of BUTTON1.

If the image attribute of BUTTON1 is changed from a smiling face to a surprised face, then all representations of BUTTON1 would be updated to reflect this change. Data structure 708 for BUTTON2 is connected to the data structure 710 associated with BUTTON1 by a child pointer, and BUTTON2 does not override the image attribute. Therefore any representations of BUTTON2 are updated in response to the modification of the image attribute of BUTTON1. In addition, the data structure 704 for FORM3 is connected to the data structure 708 for BUTTON2 by an "embedded in" pointer. Therefore, any representations of FORM3 are also updated in response to the modification of the image attribute of BUTTON1.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for establishing inheritance hierarchies between object classes in a visual programming environment, the method comprising the steps of:
    a) detecting a first user interaction with a graphical user interface;
    b) in response to the first user interaction, creating a first object class that is a subclass of a second object class;
    c) detecting a second user interaction with the graphical user interface; and
    d) in response to the second user interaction, performing the steps of
        i) creating a third object class that is a subclass of a fourth object class, wherein the third object class is not an attribute of the second object class, and
        ii) establishing the third object class as an attribute of the first object class.

2. The method of claim 1 wherein the step of detecting a second user interaction includes the step of detecting selection of a first visual indicator associated with the fourth object class.

3. The method of claim 2 wherein the step of detecting a second user interaction further includes the steps of
    a) detecting user interaction that specifies movement of the first visual indicator, and
    b) in response to detecting the user interaction that specifies movement of the first visual indicator, causing the first visual indicator to move to a region on a display device the region being associated with the first object class.

4. The method of claim 1 further comprising the steps of
    a) displaying on a display screen a first visual object that reflects values of attributes of the second object class,
    b) detecting user interaction with the first visual object, and
    c) in response to detecting user interaction with the first visual object,
        i) setting an attribute of the second object class to a new value,
        ii) determining whether the attribute has been overridden in the first object class, and
        iii) if the attribute has not been overridden in the first object class, then setting the attribute in the first object class to the new value.

5. The method of claim 4 further comprising the steps of,
    a) displaying on the display screen a second visual object that reflects values of attributes of the first object class, including values of attributes inherited by the first object class from the second object class,
    b) in response to setting the attribute of the second object class to the new value, changing how the first visual object is displayed to reflect the new value of the attribute, and
    c) in response to setting the attribute in the first object class to the new value, changing how the second visual object is displayed to reflect the new value of the attribute.

6. The method of claim 5 wherein the steps of changing how the first visual object is displayed and changing how the second visual object is displayed are performed substantially at the same time.

7. The method of claim 4 further comprising the steps of,
    a) displaying on the display screen a second visual object that reflects values of attributes of the fourth object class,
    b) detecting user interaction with the first visual object, and
    c) in response to detecting user interaction with the second visual object,
        i) setting an attribute of the fourth object class to a new value,
        ii) determining whether the attribute has been overridden in the third object class, and
        iii) if the attribute has not been overridden in the third object class, then setting the attribute in the third object class to the new value.

8. A method for establishing relationships between attributes of objects designed in a visual programming environment, the method comprising the steps of:
    a) displaying on a display device a first visual indicator that is associated with a first object class;
    b) detecting user interaction that specifies movement of the first visual indicator into a region of the display device associated with a second object class; and c) in response to detecting the user interaction, creating a third object class that is a subclass of the first object class and establishing the third object class as an attribute of the second object class.

9. The method of claim 8 wherein,
a) the method further includes the step of displaying on the display device a second visual indicator that is associated with the second object class, and
b) the step of detecting user interaction that specifies movement of the first visual indicator includes the step of detecting user interaction that specifies movement of the first visual indicator to a region of the display device proximate to where the second visual indicator is displayed.

10. A computer-readable medium having stored thereon a plurality of sequences of instructions, the plurality of sequences of instructions including sequences of instructions which, when executed by one or more processors, cause the one or more processors to perform the steps of:
a) detecting a first user interaction with a graphical user interface;
b) in response to the first user interaction, creating a first object class that is a subclass of a second object class;
c) detecting a second user interaction with the graphical user interface; and
d) in response to the second user interaction, performing the steps of
 i) creating a third object class that is a subclass of a fourth object class, wherein the third object class is not an attribute of the second object class, and
 ii) establishing the third object class as an attribute of the first object class.

11. The computer-readable medium of claim 10, wherein the instructions for detecting a second user interaction further include instructions for detecting selection of a first visual indicator associated with the fourth object class.

12. The computer-readable medium of claim 11, wherein the instructions for detecting a second user interaction further include instructions for performing the steps of
a) detecting user interaction that specifies movement of the first visual indicator, and
b) in response to detecting the user interaction that specifies movement of the first visual indicator, causing the first visual indicator to move to a region on a display device the region being associated with the first object class.

13. The computer-readable medium of claim 10, wherein the computer-readable medium further includes instructions for performing the steps of
a) displaying on a display screen a first visual object that reflects values of attributes of the second object class,
b) detecting user interaction with the first visual object, and
c) in response to detecting user interaction with the first visual object,
 i) setting an attribute of the second object class to a new value,
 ii) determining whether the attribute has been overridden in the first object class, and
 iii) if the attribute has not been overridden in the first object class, then setting the attribute in the first object class to the new value.

14. The computer-readable medium of claim 13, wherein the computer-readable medium further includes instructions for performing the steps of a) displaying on the display screen a second visual object that reflects values of attributes of the first object class, including values of attributes inherited by the first object class from the second object class,
b) in response to setting the attribute of the second object class to the new value, changing how the first visual object is displayed to reflect the new value of the attribute, and
c) in response to setting the attribute in the first object class to the new value, changing how the second visual object is displayed to reflect the new value of the attribute.

15. The computer-readable medium of claim 14, wherein the steps for changing how the first visual object is displayed and changing how the second visual object is displayed are performed substantially at the same time.

16. The computer-readable medium of claim 13, wherein the computer-readable medium further includes instructions for performing the steps of
a) displaying on the display screen a second visual object that reflects values of attributes of the fourth object class,
b) detecting user interaction with the first visual object, and
c) in response to detecting user interaction with the second visual object,
 i) setting an attribute of the fourth object class to a new value,
 ii) determining whether the attribute has been overridden in the third object class, and
 iii) if the attribute has not been overridden in the third object class, then setting the attribute in the third object class to the new value.

17. A computer readable medium having stored thereon sequences of instructions for establishing relationships between attributes of objects designed in a visual programming environment, the sequences of instructions including instructions which, when executed by one or more processors, cause the one or more processors to perform the steps of:
a) displaying on a display device a first visual indicator that is associated with a first object class;
b) detecting user interaction that specifies movement of the first visual indicator into a region of the display device associated with a second object class; and
c) in response to detecting the user interaction, creating a third object class that is a subclass of the first object class and establishing the third object class as an attribute of the second object class.

18. The computer readable medium of claim 17 wherein,
a) the sequences of instructions further include instructions for displaying on the display device a second visual indicator that is associated with the second object class, and
b) the step of detecting user interaction that specifies movement of the first visual indicator includes the step of detecting user interaction that specifies movement of the first visual indicator to a region of the display device proximate to where the second visual indicator is displayed.

19. A computer system comprising:
one or more processors;
memory coupled to said one or more processors;
sequences of instructions stored in said memory;
a display device displaying a user interface in response to execution of said sequences of instructions by said one or more processors, said user interface including a first visual indicator that is associated with a first object class, and a region of the display device associated with a second object class;

a user input device through which a user can interact with the user interface;

an event handler for detecting user interaction that specifies movement of the first visual indicator into the region of the display device associated with the second object class; and an object handler configured to create a third object class that is a subclass of the first object class and establish the third object class as an attribute of the second object class in response to detecting the user interaction.

20. The computer system of claim 19 wherein, the display device displays a second visual indicator that is associated with the second object class, and the object handler creates the third object class in response to detecting user interaction that specifies movement of the first visual indicator to a region of the display device proximate to where the second visual indicator is displayed.

* * * * *